May 6, 1924.
J. ROGERS
FUR STRETCHER OR FORM
Filed April 6, 1923
1,492,751
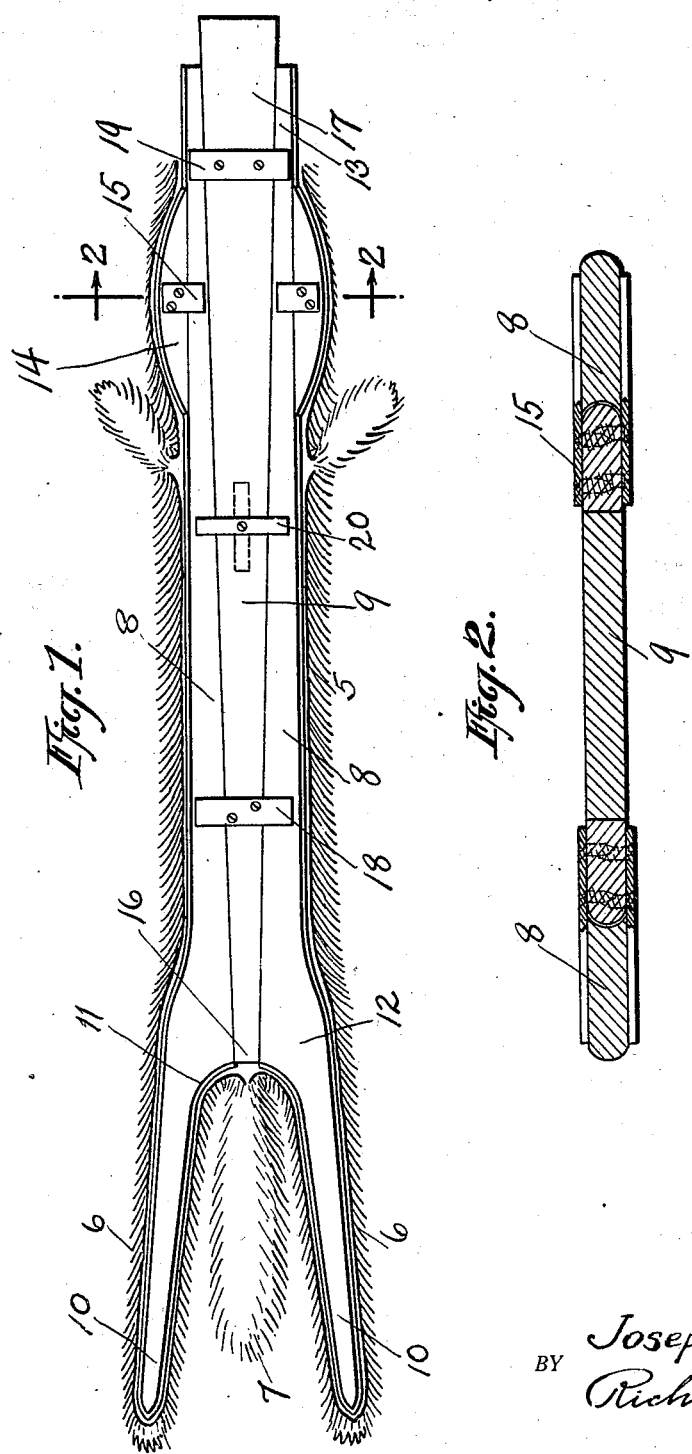
INVENTOR.
Joseph ROGERS.
BY
Richard B. Owen
ATTORNEY.

Patented May 6, 1924.

1,492,751

UNITED STATES PATENT OFFICE.

JOSEPH ROGERS, OF NEW YORK, N. Y.

FUR STRETCHER OR FORM.

Application filed April 6, 1923. Serial No. 630,307.

*To all whom it may concern:*

Be it known that I, JOSEPH ROGERS, a subject of the King of England, residing at New York, in the county of New York and State of New York, have invented certain new and useful Improvements in Fur Stretchers or Forms, of which the following is a specification.

This invention relates to new and useful improvements in skin or fur stretching and shaping devices and has relation more particularly to a novel and improved device for shaping, squaring, pressing and finishing the back paws of the skin in one operation instead of in different operations as has been the practice, thus increasing the quantity and improving the character of workmanship in this art.

One of the objects of my invention is to provide a sectional skin stretching and forming device which is inserted in the body of the skin and extends into the extreme ends thereof to shape the paws without resorting to the use of pins or other fastening devices which has been heretofore the practice.

The invention consists in the details of construction and combination and arrangement of the several parts of the fur shaping and stretching device, whereby many advantages are attained in a simple, inexpensive and convenient construction, as will be hereinafter more fully set forth.

I accomplish the above objects and others which will be more fully understood when considered in connection with the accompanying drawings, showing a preferred embodiment of my invention, and wherein:

Figure 1 is a plan showing the stretcher in its relation to the skin of an animal.

Figure 2 is a sectional view taken substantially on the line 2—2 of Figure 1.

Referring now to the drawings wherein like reference characters designate corresponding parts throughout the several views, 5 designates generally the body portion of a skin and 6, 7, the paws and tail thereof in which the stretcher and shaping device is to be inserted. The device proper consists of a wooden or metallic sectional block or form and comprises outer sections 8 adapted to be inserted through the body of the skin into the paws and separated by the central wedge indicated in its entirety by numeral 9. Each section 8 tapers gradually as at 10 and is curved on its inner side 11 near the widest point 12. The opposite ends 13 of each section gradually taper from its center and have attached thereto a curved, segmental block 14 having upper and lower guide plates 15 which permit said block to slide along the edges of the outer sections to a position at the thinned out portion of the skin adjacent the front paws. The central wedge 9 gradually tapers from its narrow end 16 to its widest end 17, thus separating the respective outer sections and consequently stretching the skin as the wedge is inserted. It will be noted that the wedge, when forced between the sections, produces a substantially U-shaped block at one end of the skin and thus avoids the practice in this art, of pinning the skins when shaping the same. The central wedge 9 is also provided with the guide plates 18, 19, secured by the screws or other fastening elements thereto so that the wedge will properly cooperate with the respective sections when the same is placed therebetween to stretch the skin.

A pivoted plate 20 is also provided which prevents the relative displacement of the outer sections with respect to the wedge when the latter is inserted.

While I have illustrated and described my invention with some degree of particularity, I realize that in practice various alterations may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A skin stretcher comprising two tapered sections insertable through the body of a skin, one end of each section extending into the paws thereof and a wedge for separating said sections.

2. A skin stretcher comprising two sections insertable through the body of a skin, each section gradually tapering toward its ends and adapted to be inserted into the paws of the skin and a wedge for separating said sections.

3. A skin stretcher comprising two sections insertable through the body of a skin, one end of each section extending slightly outwardly from the body thereof and gradually tapering toward its extremity and a wedge insertable between the sections forming a U-shaped block.

4. A skin stretcher comprising two sections insertable through the body of a skin, one end of each section extending slightly outwardly from the body thereof and curved on its inner side, a wedge insertable between the respective sections forming a U-shaped block at one end and guides for retaining the sections and wedge together.

In testimony whereof I affix my signature.

JOSEPH ROGERS. [L. S.]